United States Patent
Fritz et al.

(10) Patent No.: US 9,589,166 B2
(45) Date of Patent: *Mar. 7, 2017

(54) LASER SCANNING SYSTEM EMPLOYING AN OPTICS MODULE CAPABLE OF FORMING A LASER BEAM HAVING AN EXTENDED DEPTH OF FOCUS (DOF) OVER THE LASER SCANNING FIELD

(71) Applicant: METROLOGIC INSTRUMENTS, INC., Blackwood, NJ (US)

(72) Inventors: Bernard Fritz, Morristown, NJ (US); James Allen Cox, Morris Plains, NJ (US); Peter L. Reutiman, Morristown, NJ (US)

(73) Assignee: Metrologic Instruments, Inc., Blackwood, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/178,854

(22) Filed: Jun. 10, 2016

(65) Prior Publication Data
US 2016/0283762 A1    Sep. 29, 2016

Related U.S. Application Data

(63) Continuation of application No. 14/499,450, filed on Sep. 29, 2014, now Pat. No. 9,367,719, which is a
(Continued)

(51) Int. Cl.
*G06K 7/10* (2006.01)
*G02B 26/10* (2006.01)
(Continued)

(52) U.S. Cl.
CPC ....... *G06K 7/10881* (2013.01); *G02B 26/105* (2013.01); *G06K 7/10633* (2013.01); *G06K 7/10683* (2013.01); *G06K 7/10811* (2013.01); *G06K 7/10831* (2013.01); *G06K 19/06112* (2013.01); *G02B 27/0031* (2013.01)

(58) Field of Classification Search
USPC ....................... 235/462.01–462.49
See application file for complete search history.

(56) References Cited

U.S. PATENT DOCUMENTS

| 5,080,456 A | 1/1992 | Katz et al. |
| 5,331,143 A | 7/1994 | Marom et al. |

(Continued)

*Primary Examiner* — Daniel Hess
(74) *Attorney, Agent, or Firm* — Addition, Higgins & Pendleton, P.A.

(57) ABSTRACT

A laser scanning system having a laser scanning field, and a laser beam optics module with an optical axis and including: an aperture stop disposed after a laser source for shaping the laser beam to a predetermined beam diameter; a collimating lens for collimating the laser beam produced from the aperture stop; an apodization element having a first and second optical surfaces for extending the depth of focus of the laser beam from the collimating lens; and a negative bi-prism, disposed after the apodization element, along the optical axis, to transform the energy distribution of the laser beam and cause the laser beam to converge to substantially a single beam spot along the far-field portion of the laser scanning field, and extend the depth of focus of the laser beam along the far-field portion of the laser scanning field.

20 Claims, 18 Drawing Sheets

Related U.S. Application Data continuation of application No. 13/233,332, filed on Sep. 15, 2011, now Pat. No. 8,844,823.

(51) Int. Cl.
  *G06K 19/06* (2006.01)
  *G02B 27/00* (2006.01)

(56) References Cited

U.S. PATENT DOCUMENTS

| | | | |
|---|---|---|---|
| 6,042,012 A | 3/2000 | Olmstead et al. | |
| 6,547,139 B1 | 4/2003 | Havens et al. | |
| 6,771,683 B2 | 8/2004 | Scaggs | |
| 7,063,261 B2 | 6/2006 | Vinogradov et al. | |
| 7,224,538 B2 | 5/2007 | Vinogradov et al. | |
| 8,844,823 B2 * | 9/2014 | Fritz | G06K 7/10633 |
| | | | 235/462.33 |
| 9,367,719 B2 * | 6/2016 | Fritz | G06K 7/10633 |

* cited by examiner

Hand-Supportable Bar Code Symbol Reader Employing
A Conventionally Elongated Laser Scanning Beam

LASER SCANNING SYSTEM EMPLOYING AN OPTICS MODULE CAPABLE OF FORMING A LASER BEAM HAVING AN EXTENDED DEPTH OF FOCUS (DOF) OVER THE LASER SCANNING FIELD

CROSS-REFERENCE TO RELATED APPLICATIONS

The present application claims the benefit of U.S. patent application Ser. No. 14/499,450 for a Laser Scanning System Employing an Optics Module Capable of Forming a Laser Beam having an Extended Depth of Focus (DOF) over the Laser Scanning Field filed Sep. 29, 2014 (and published Feb. 19, 2015 as U.S. Patent Publication No. 2015/0048168), now U.S. Pat. No. 9,367,719, which claims the benefit of U.S. patent application Ser. No. 13/233,332 for a Laser Scanning System Employing an Optics Module Capable of Forming a Laser Beam having an Extended Depth of Focus (DOF) over the Laser Scanning Field filed Sep. 15, 2011 (and published Mar. 21, 2013 as U.S. Patent Application Publication No. 2013/0070322), now U.S. Pat. No. 8,844,823. Each of the foregoing patent applications, patent publications, and patents is hereby incorporated by reference in its entirety.

FIELD OF INVENTION

The present disclosure relates to an improved method of and apparatus for extending the depth of focus (DOF) of a laser beam used in a laser scanning bar code symbol reading system, and more particularly, extending the depth of focus of the laser scanning beam over both the far-field and near-field portions of the laser scanning field.

BACKGROUND

The use of laser scanning bar code symbol reading systems is well known in the art. As shown in FIG. 1, conventional laser scanning systems have the capacity to scan and read bar code symbols 116 over the laser scanning field 115 using a laser scanning beam 10 generated from a conventional visible laser diode (VLD), an aperture stop, and a collimating lens.

As shown in FIG. 2 attempts to improve the depth of focus of conventional laser scanning systems have proposed the use of aperture stops and axicon lens combinations, after the light collimating lens, to focus the laser beam and minimize beam spread during the propagation of the laser beam 10 during scanning operations within the working range of the system.

U.S. Pat. No. 5,080,456 to Katz et al. and U.S. Pat. No. 5,331,143 to Marom et al. disclose the use of axicon (i.e. rotationally-symmetric) optical elements for shaping laser beams, and extending the depth of focus thereof in laser scanning systems.

While axicon elements help to extend the depth of focus of laser beams, the resulting laser beams typically have limitations when scanning fine (i.e. 3 mil) code symbols at short ranges, while allowing reading of coarse (i.e. 100 mil) code symbols at long ranges (greater than 100 inches from the light transmission window).

Thus, there is a great need in the art to provide an improved method of and apparatus for generating laser beams having an extended depth of focus, without the shortcoming and drawbacks of prior art systems which, hitherto, have compromised system performance in significant ways.

SUMMARY

A primary object of the present disclosure is to provide an improved method of and apparatus for generating a laser beam capable of scanning high-density (e.g. 3 mil) bar code symbols at short-range distances (e.g. less than 6.0 inches from the light transmission window) and low density bar codes (100 mil) at long range distances from the system.

Another object is to provide a laser scanning bar code symbol reading system for having the capacity to laser scan and read high-density bar code symbols at both short range distances (e.g. less than 6 inches) and long range distances (e.g. greater than 100 inches) from the from the light transmission window of the scanning system.

Another object of the present invention is to provide such a laser scanning bar code symbol reading system, with a laser beam optics module having an aperture stop, a light collimating lens, an apodization optical lens element, and a negative bi-prism, arranged together as an optical assembly, causing the energy distribution of the laser beam produced therefrom to converge substantially to a single spot at predetermined far-field distance (e.g. 100 inches) from the light transmission window of the scanning system.

Another object of the present invention is to provide an improved optics module for producing a laser beam, wherein the optics module comprises an assembly of components including an aperture stop, a light collimating lens, an apodization optical lens element, and a negative bi-prism, arranged together to causing the energy distribution of the laser beam produced therefrom to converge to a single spot at predetermined far-field distance (e.g. 100 inches) from the light transmission window of the scanning system.

Further objects of the present disclosure will become more apparently understood hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein.

DETAILED DESCRIPTION

Figure 1:
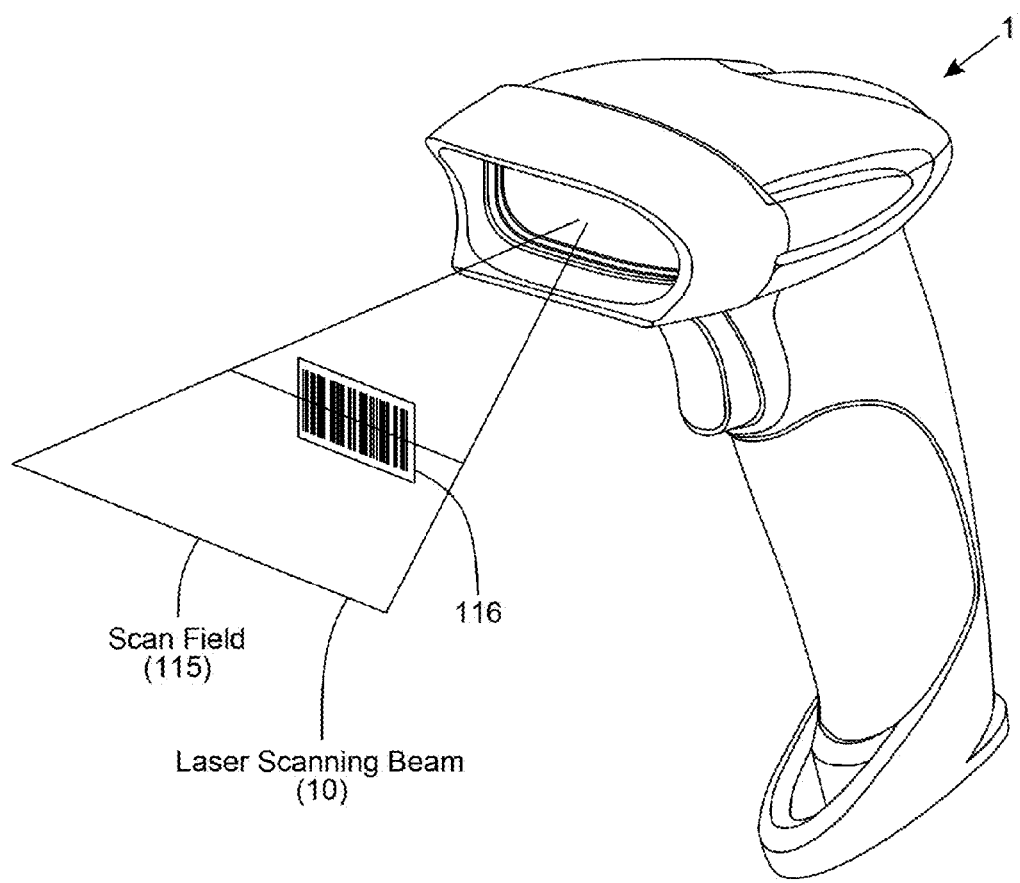
FIG. 1 is a perspective view of an illustrative embodiment of a conventional laser scanning bar code symbol reading system, having the capacity to scan and read bar code symbols in its scanning field using a laser scanning beam generated from a conventional laser beam production module comprising a laser diode, a collimating lens, and an axicon (i.e. rotationally-symmetric prism lens), specified in FIG. 2.
Figure 2:
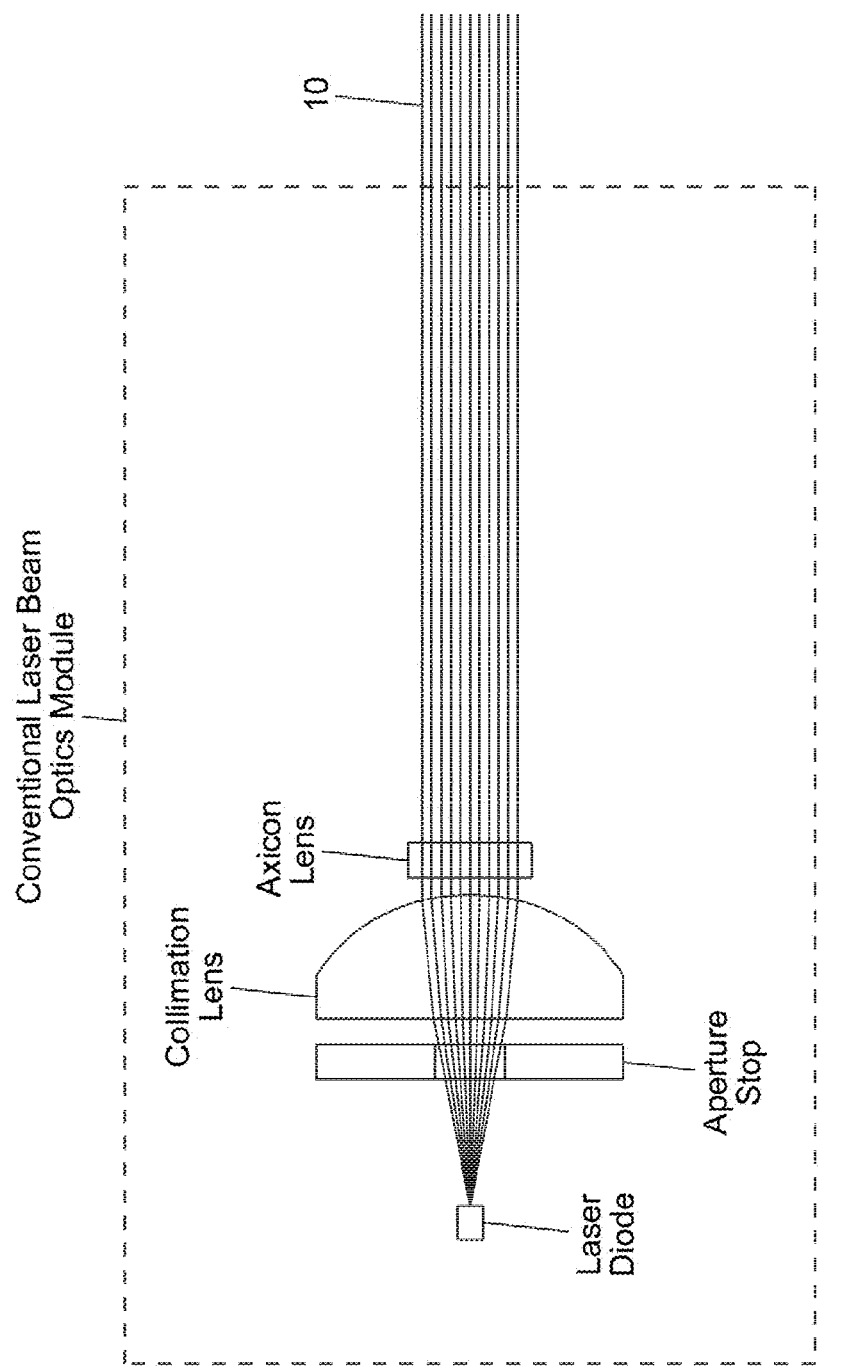
FIG. 2 is a schematic representation of the conventional laser beam production module employed in laser scanning bar code symbol reading system illustrated of FIG. 1, comprising a laser scanning beam generated using a laser diode, a collimating lens, and axicon (i.e. rotationally-symmetric prism lens), as shown.

Referring to the figures in the accompanying Drawings, the illustrative embodiments of the laser-scanning bar code symbol reading system will be described in great detail, wherein like elements will be indicated using like reference numerals.

Figure 3:
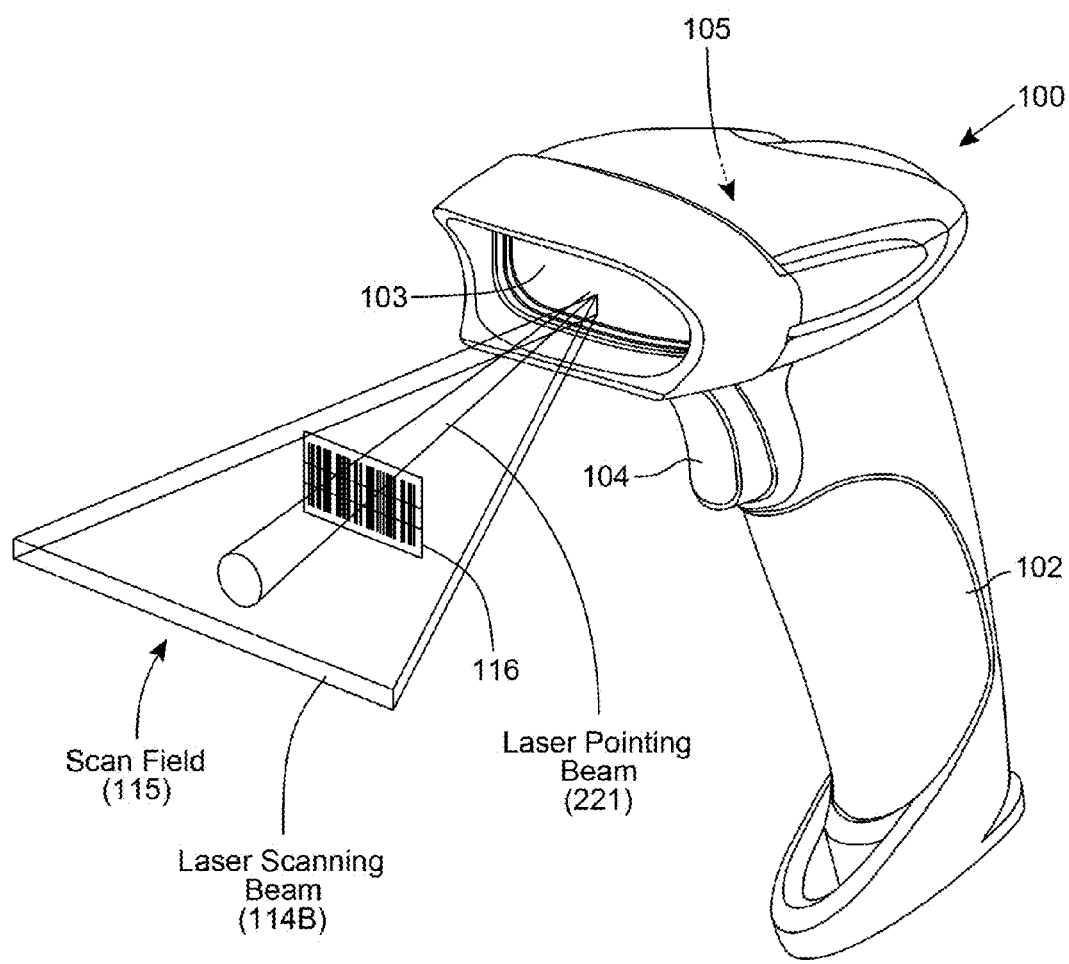
FIG. 3 is a perspective view of an illustrative embodiment of a hand-supportable laser scanning bar code symbol reading system according to the present disclosure, having the capacity to scan and read bar code symbols in its scanning field using an improved laser scanning beam generated a laser beam production module comprising a laser diode, a collimating lens, an apodization element, and a negative bi-prism operably connected thereto along the optical axis of the apodizing element.

As shown in FIGS. 3, the laser scanning bar code symbol reading system 100 comprises: a hand-supportable housing 102 having a head portion and a handle portion supporting the head portion; a light transmission window 103 integrated with the head portion of the housing 102; a manually-actuated trigger switch 104 integrated with the handle portion of the housing, for activating its laser scanning module 105 with a laser scanning field 115; and an IR-based object detection subsystem 219 generating an IR beam within the near-field portion of the laser scanning field, as shown in FIG. 3, for automatically detecting the presence of an object in the near field portion of the laser scanning field, and triggering the system when an object is automatically detected in near portion of the scanning field.

Figure 4:
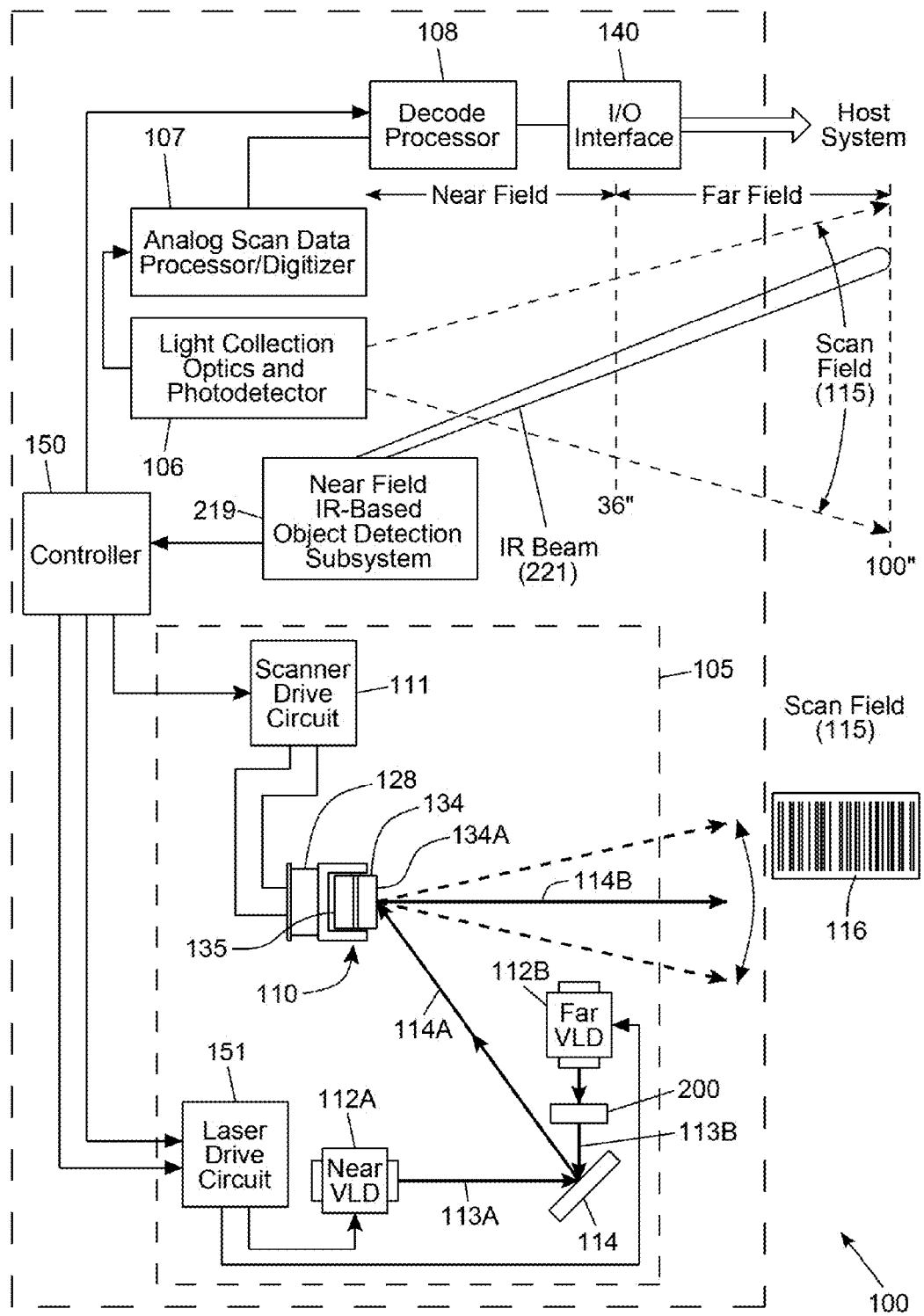
FIG. 4 is a schematic block diagram describing the major system components of the laser scanning bar code symbol reading system shown in FIG. 3.

As shown in FIGS. 3 and 4, the laser scanning bar code symbol reading system 100 further comprises: a laser scanning module 105, for repeatedly scanning, across the laser scanning field, either (i) a laser beam generated by a near-field laser source 112A (e.g. VLD and/or IR LD) having optics to produce a laser scanning beam focused in the near portion of the laser scanning field, in response to a first control signal generated by a system controller 150 when the module 105 is operating in its near-field laser illumination mode of operation, or (ii) a laser beam generated by a far-field laser source 112B (e.g. VLD and/or IR LD) having optics 200 to produce a laser scanning beam having an extended depth of focus (DOF) within the far portion of the laser scanning field, in response to a second control signal generated by the system controller 150 when the module 105 is operating in its far-field laser illumination mode of operation, wherein the mode of operation depends on the results of real-time analysis performed by the system controller 150 while carrying out the method of operation, specified in FIG. 3; wherein the laser scanning module 105 also includes a laser drive circuit 151 for receiving first and second control signals from system controller 150, and in response thereto, generating and delivering first and second laser (diode) drive current signals to the near-field laser source 112A and the fair-field laser diode source 112B, respectively, to selectively produce near-field and far-field laser scanning beams during the method of bar code symbol reading described in FIG. 3; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure; programmed decode processor 108 for decode processing digitized data signals, and generating symbol character data representative of each bar code symbol scanned by either a visible or invisible laser scanning beam; an input/output (I/O) communication interface module 140 for interfacing with a host communication system and transmitting symbol character data thereto via wired or wireless communication links that are supported by the symbol reader and host system; and a system controller 150 for generating the necessary control signals for controlling operations within the hand-supportable laser scanning bar code symbol reading system.

Figure 12A:
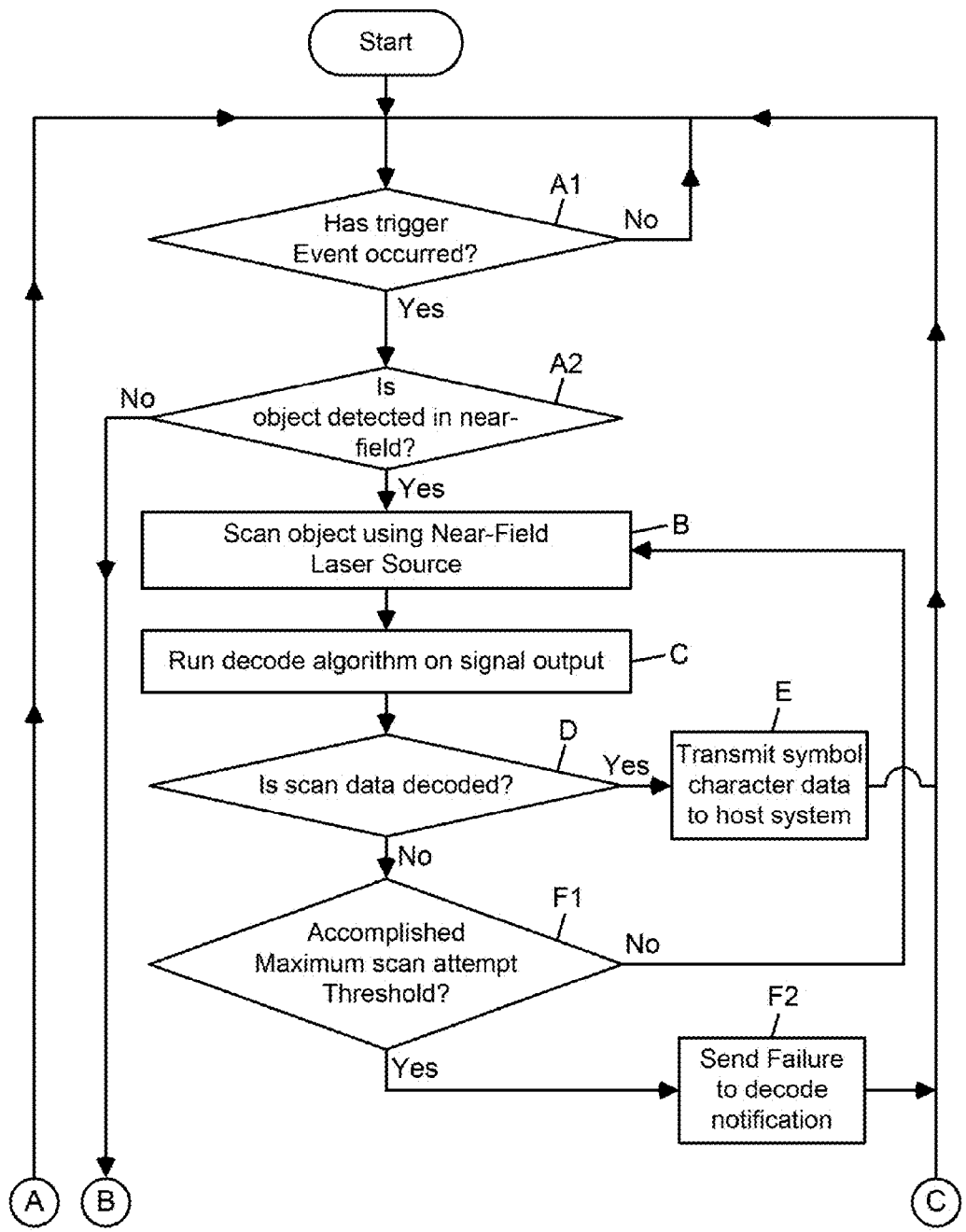
FIGS. 12A and 12B, taken together, set forth a flow chart describing the primary steps carried out when controlling the laser scanning system of FIG. 3 during it manually-triggered mode of operation.
Figure 12B:
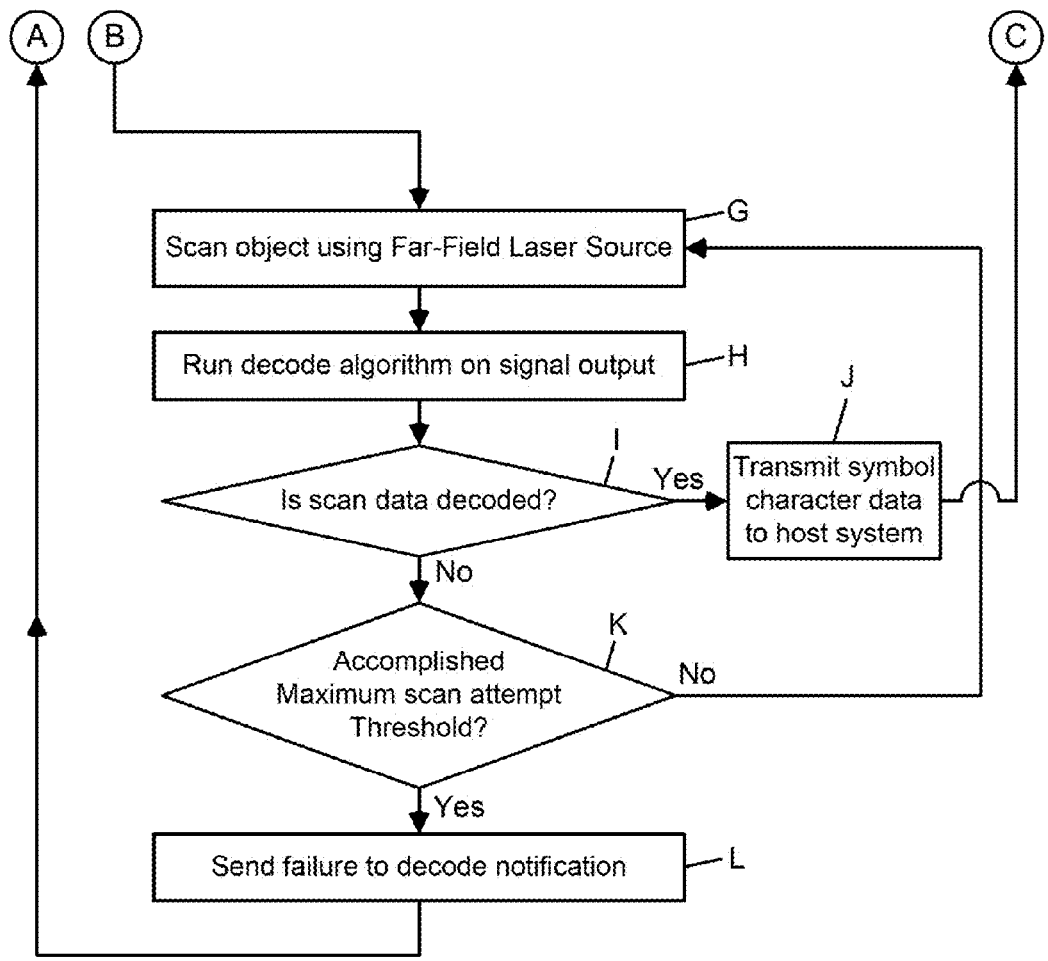

In general, system 100 has a manually-triggered mode of system operation controlled using trigger switch 104, as specified in FIGS. 12A and 12B. Also, system 100 also an automatically-triggered mode of system operation controlled using IR-based object detection subsystem 219.

Figure 5A:
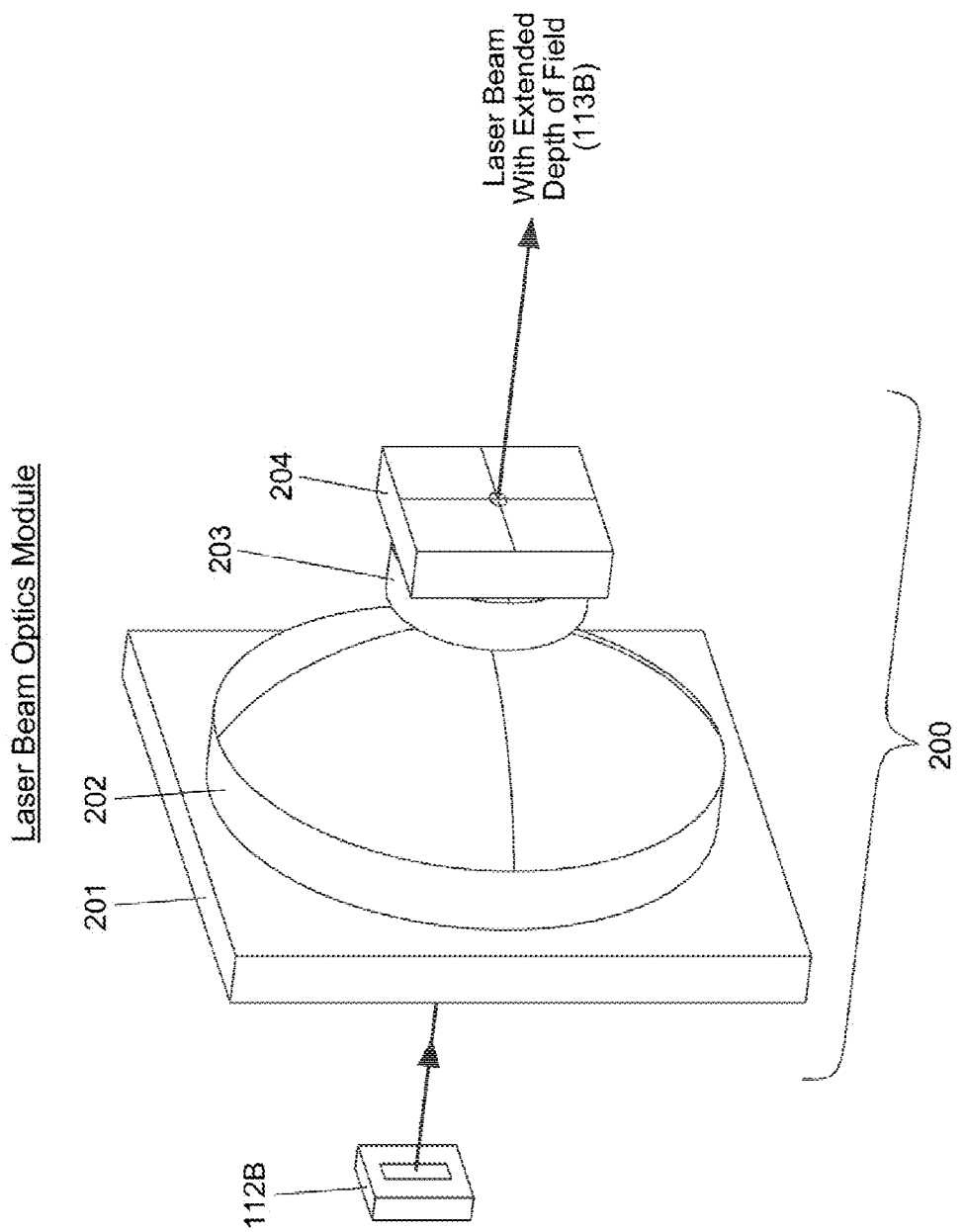
FIG. 5A is a 3D optical schematic diagram of the improved laser beam optics module employed in the laser scanning bar code symbol reader of FIG. 3, and shown comprising a collimating lens, an apodization element and a negative bi-prism element, arranged together as an optical lens assembly.
Figure 5B:
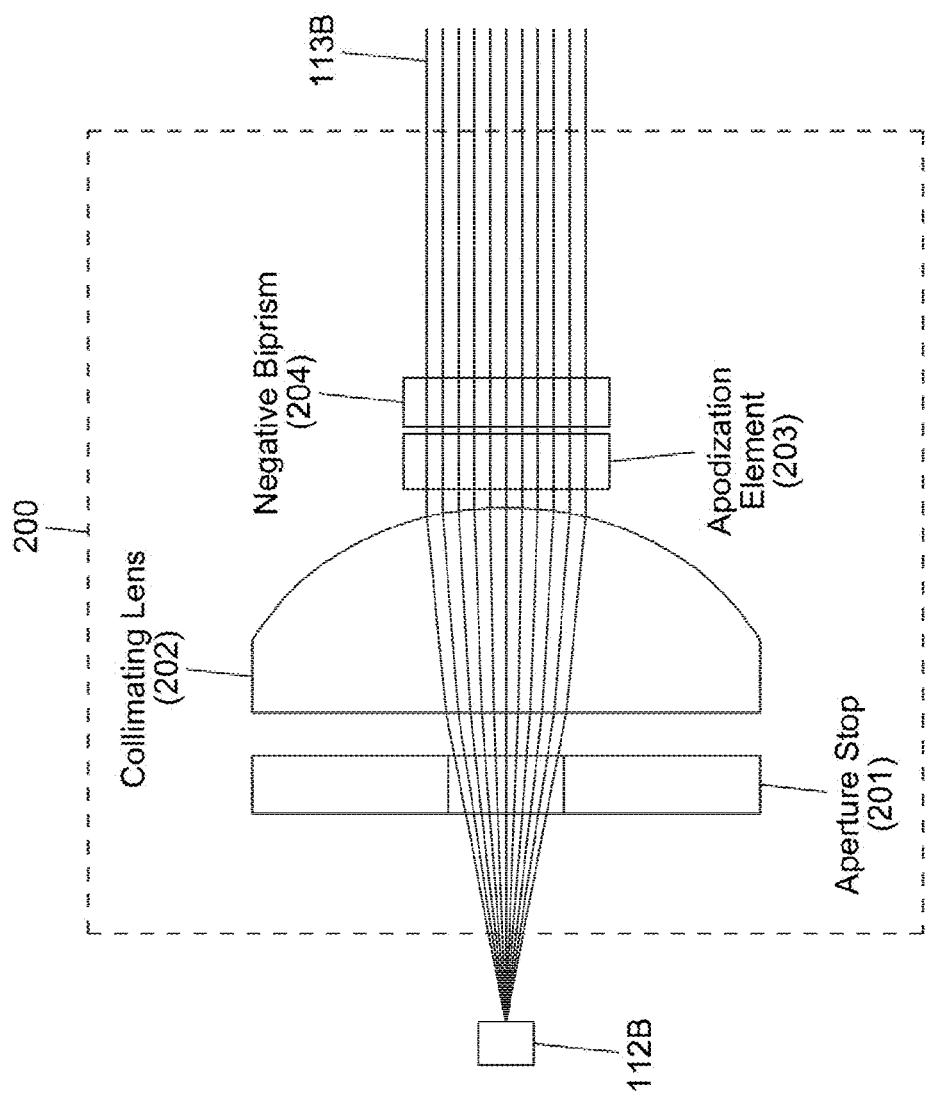
FIG. 5B is a 2D optical schematic diagram of the improved laser beam optics module (i.e. assembly) shown in FIG. 5A.
Figure 6A:
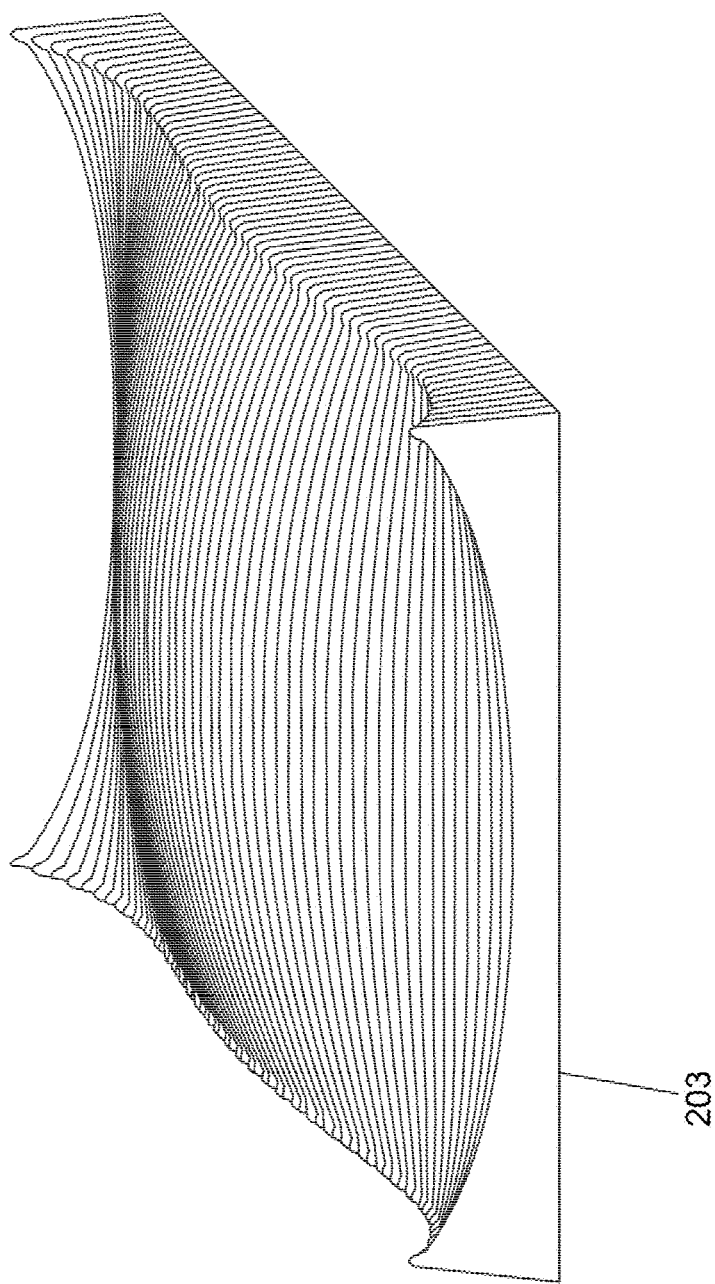
FIG. 6A is a first 3D perspective view of the apodization lens element employed in the laser beam optics assembly depicted in FIGS. 5A and 5B.
Figure 6B:
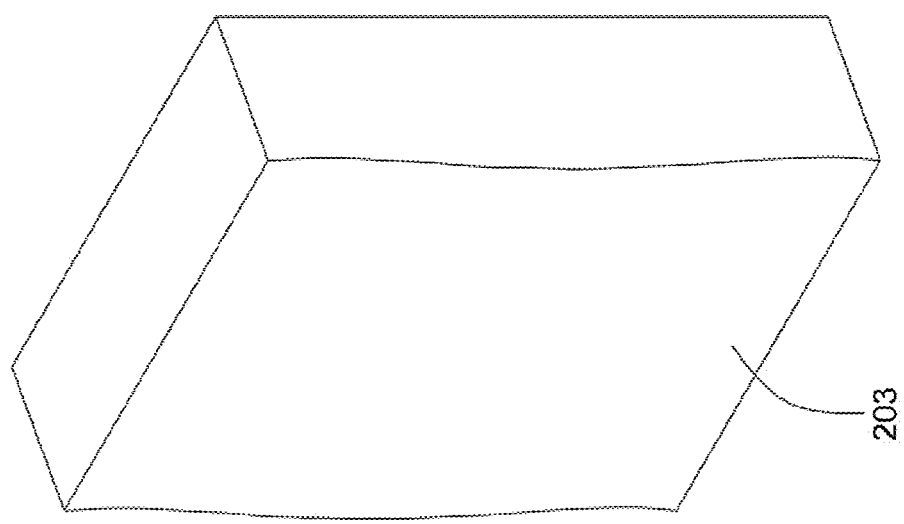
FIG. 6B is a second 3D perspective view of the apodization lens element employed in the laser beam optics assembly depicted in FIGS. 5A and 5B.

As shown in FIGS. 5A and 5B, laser beam optics module 200 for the far-field range laser beam provides a simple and effective solution to spot separation issue of conventional optics module design.

Figure 7A:
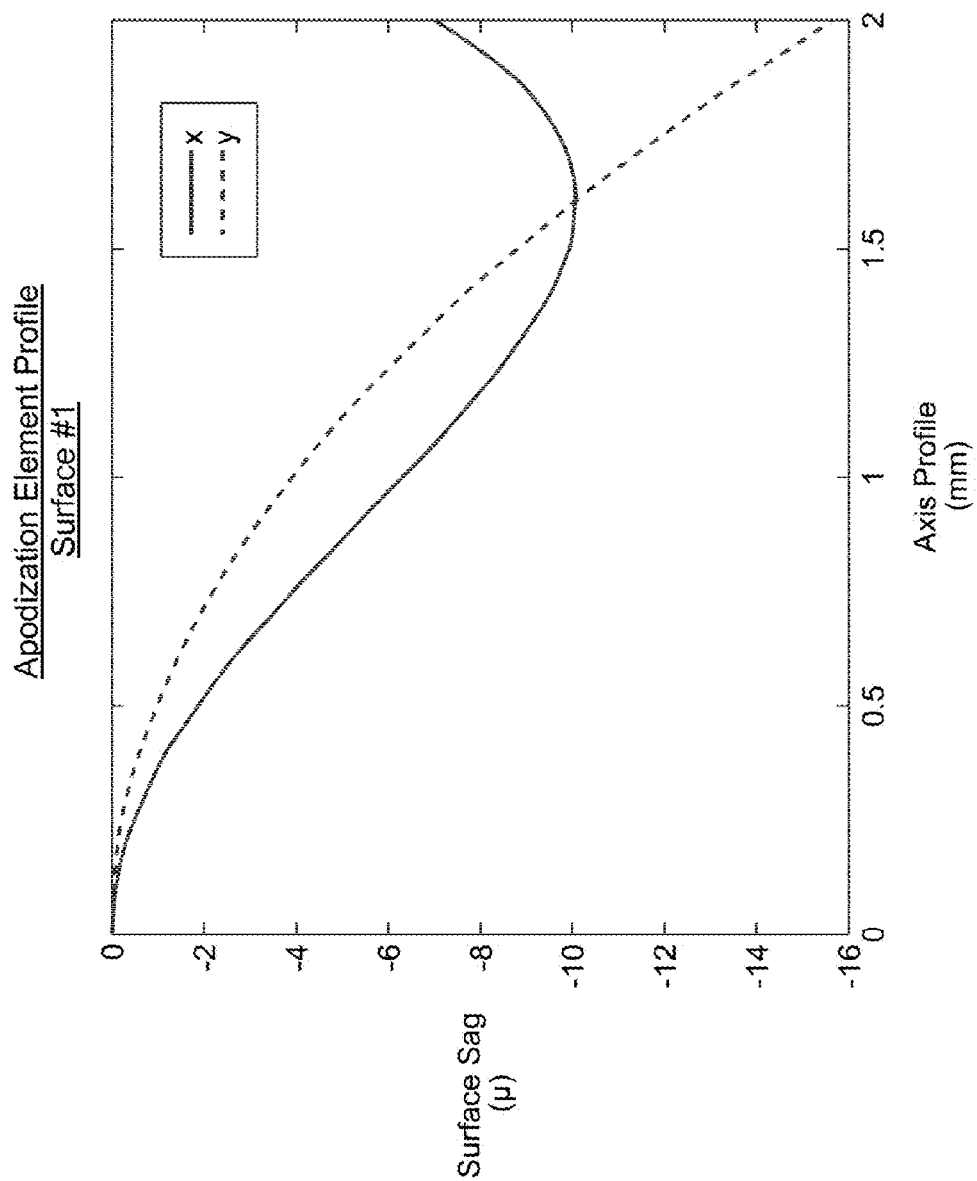
FIG. 7A is a graphical representation specifying the front surface profile of the apodization element employed in the laser beam optics module shown in FIGS. 5A and 5B.
Figure 7B:
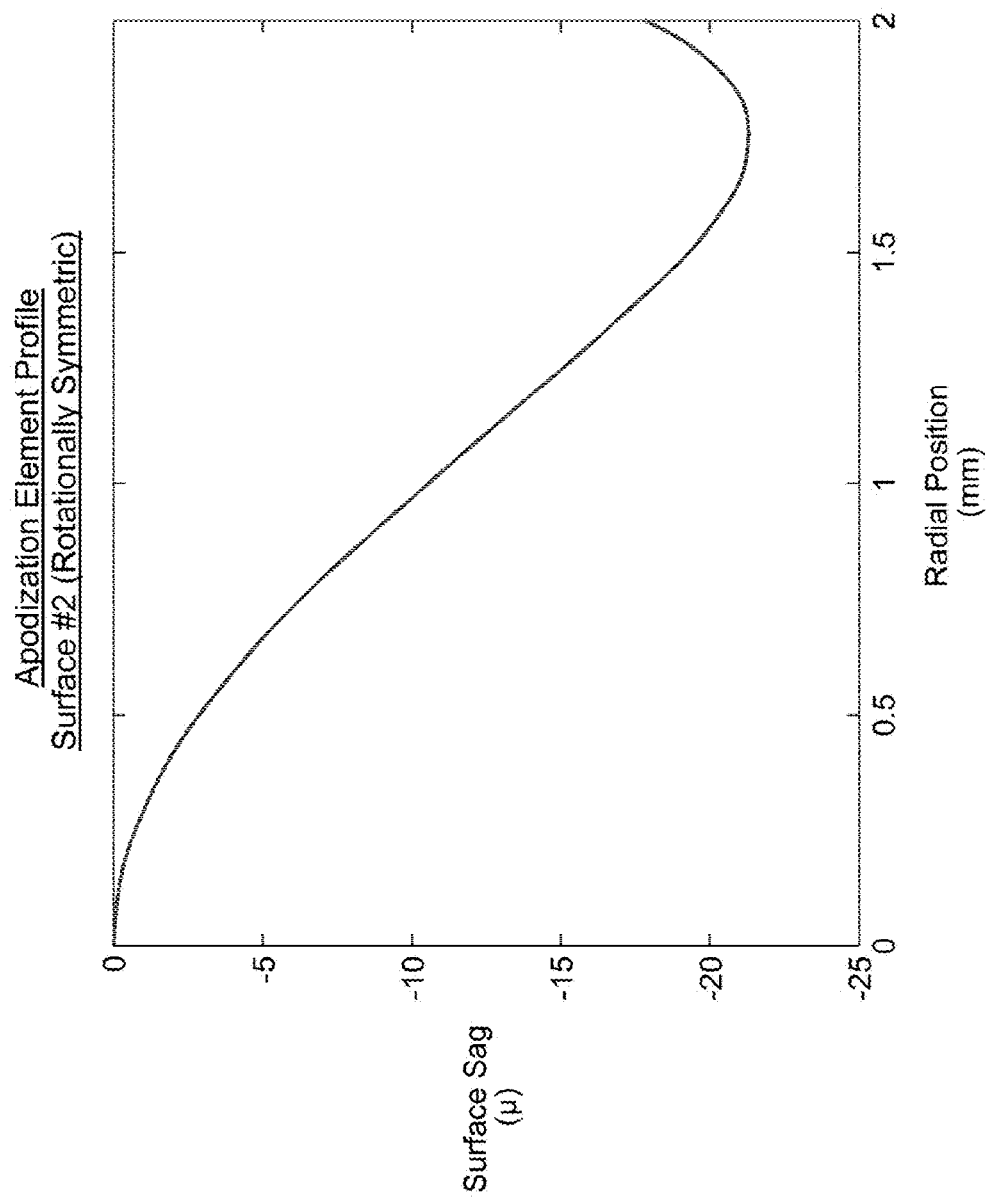
FIG. 7B is a graphical representation specifying the rear surface profile of the apodization element employed in the laser beam optics module shown in FIGS. 5A and 5B.

As shown in FIGS. 5A and 5B, laser beam optics module 200 comprises: an aperture stop 201 (disposed after VLD 112B, or a negative bi-prism 204, or at an intermediate location) for shaping the beam to a diameter 2R; a collimating lens 202 for collimating the input laser beam from the aperture stop; an apodization (i.e. rotationally symmetric) element 203 having a first and second optical surfaces as specified in FIGS. 7A and 7B for extending the depth of focus of the output laser beam; and a negative bi-prism 204, disposed immediately after the apodization element 203, along its optical axis, to transform the energy distribution of the laser beam can cause the laser beam to converge to a single beam spot at long distances (e.g. 100 inches) from the scanning window, and scan low-density bar code symbols over the far (i.e. long distance) scanning range and high density bar code over the near (i.e. short) distance scanning range.

Figure 8:
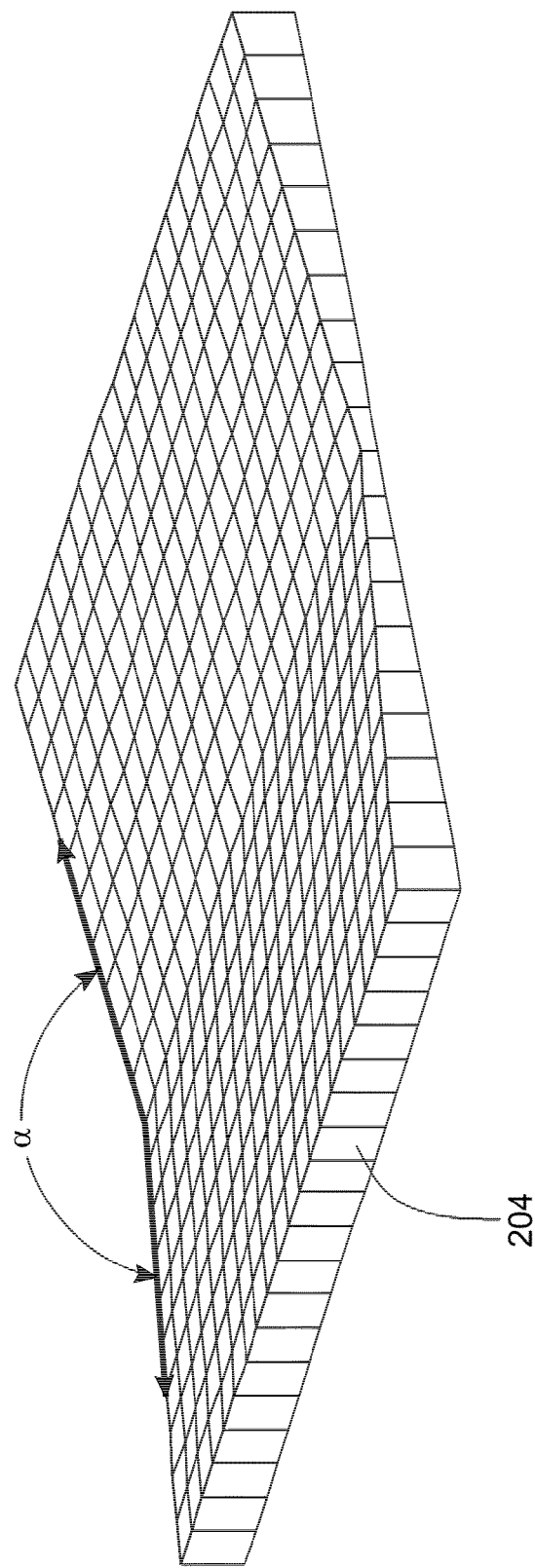
FIG. 8 is a 3D perspective view of the negative bi-prism lens element employed in the laser beam optics assembly depicted in FIGS. 5A and 5B.
Figure 9:
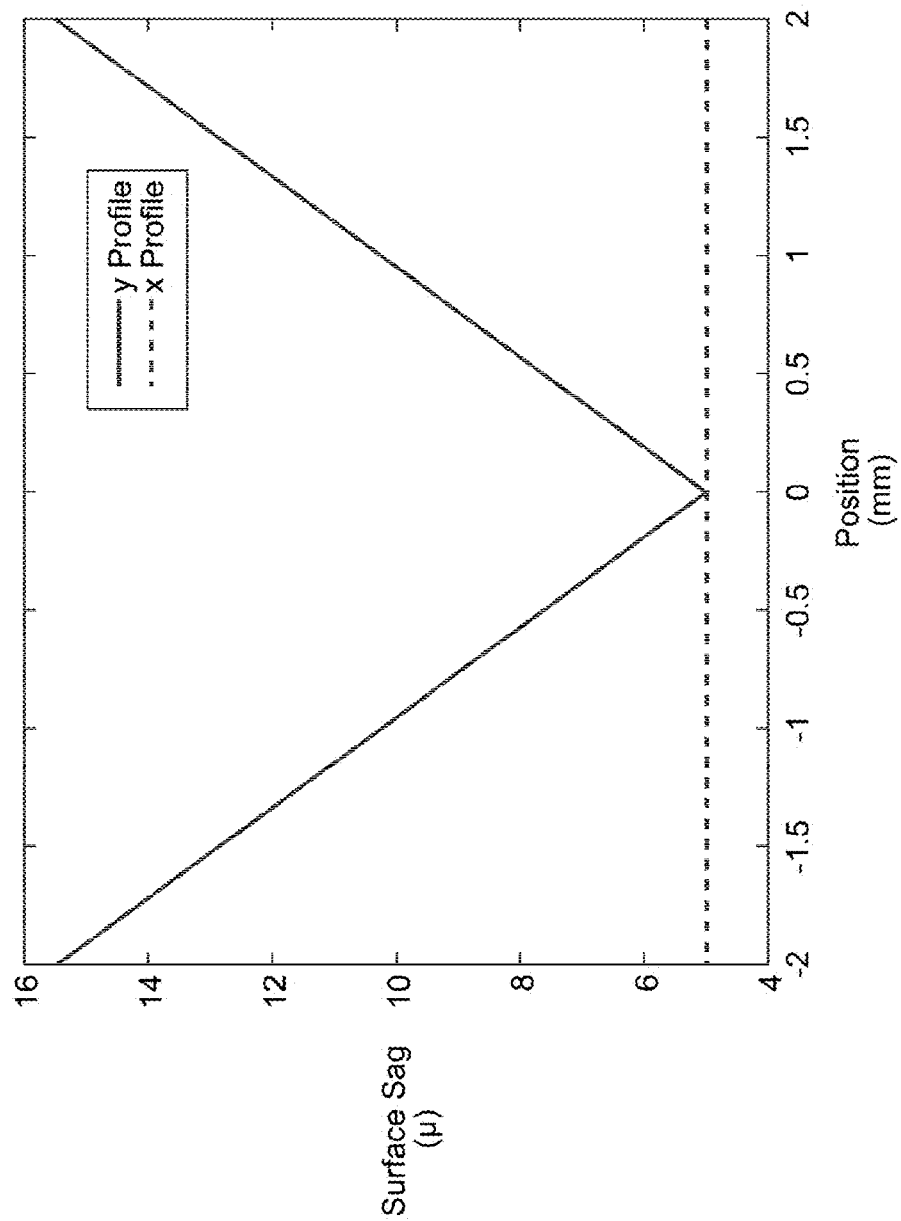
FIG. 9 is a graphical representation specifying the x and y profile of the negative bi-prism employed in the improved laser beam optics module shown in FIGS. 5A and 5B.
Figure 10:
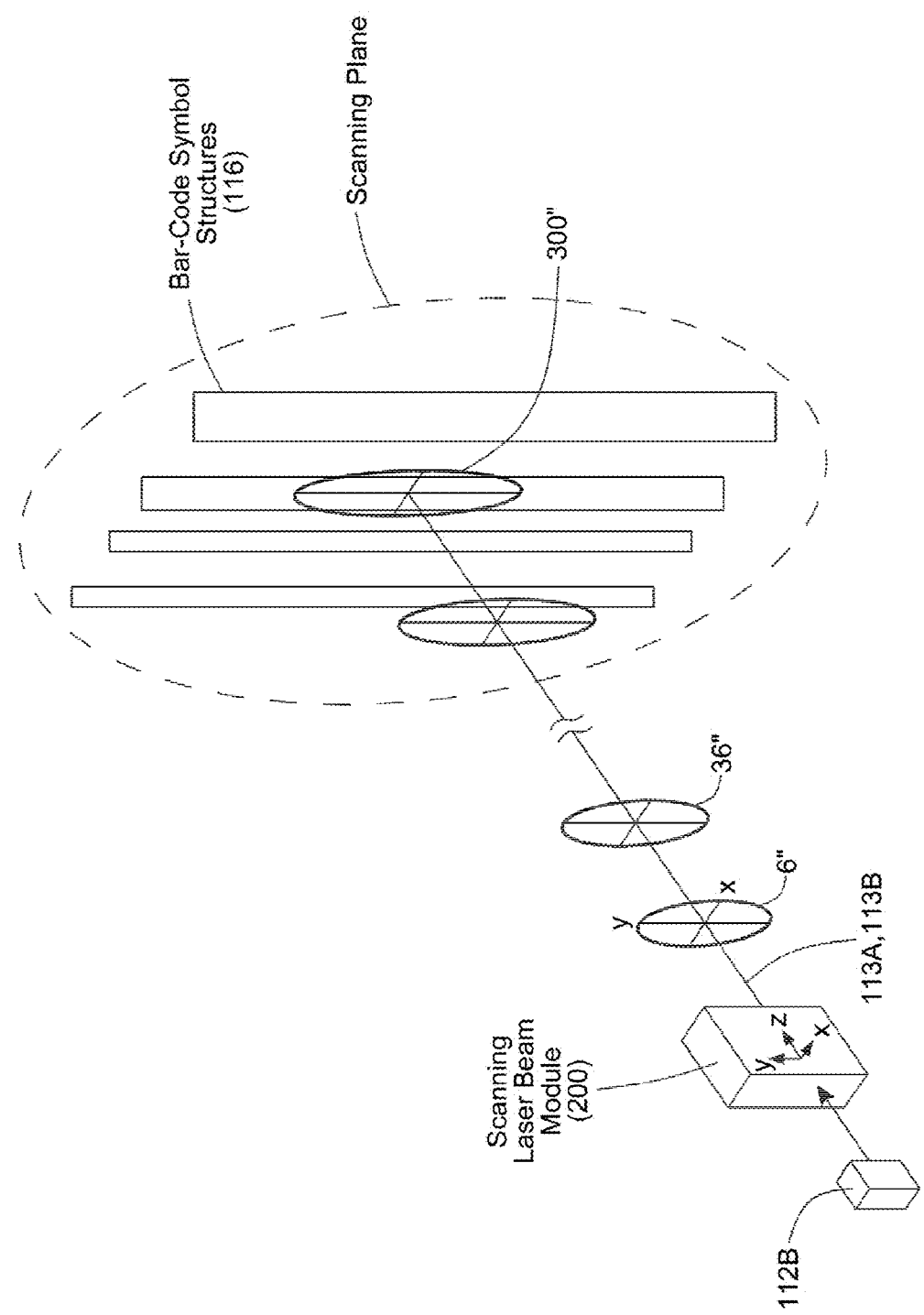
FIG. 10 is a schematic representation illustrating variation in the cross-sectional dimensions and characteristics of laser beam produced from the improved laser beam optics module shown in FIGS. 5A and 5B, at several discrete distances (e.g. 6", 36", and 300" from the exit pupil of the optics assembly)
Figure 11A:
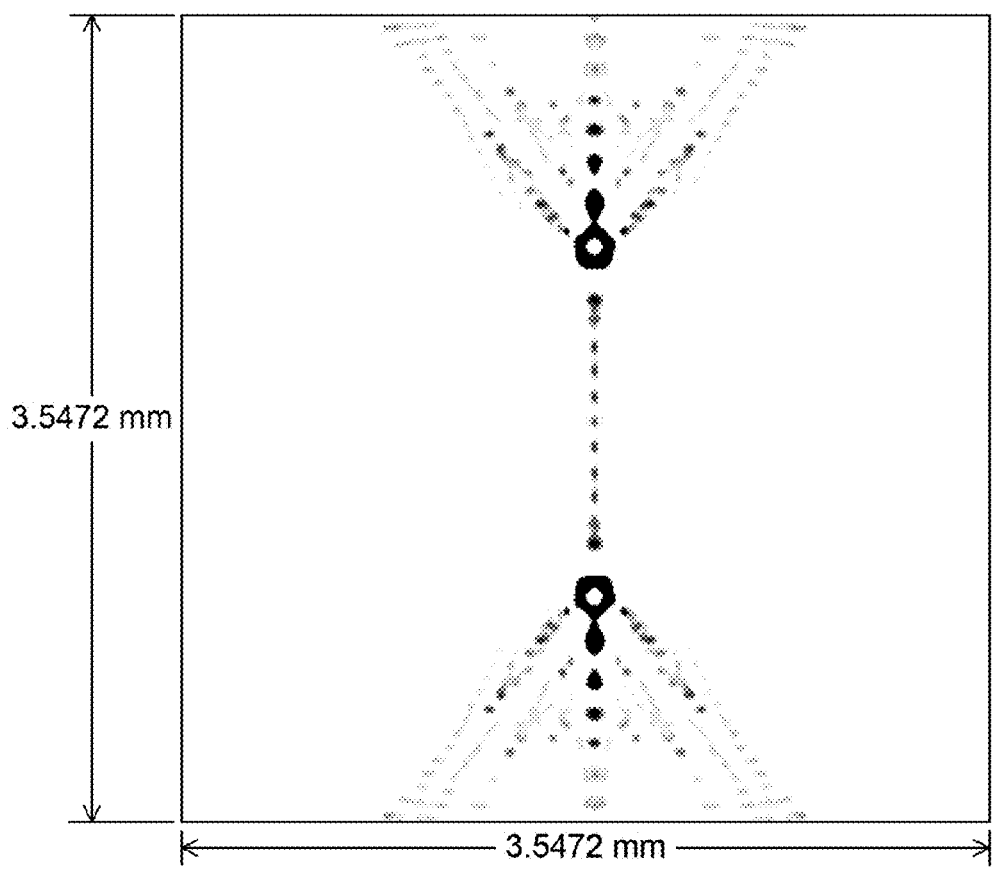
FIG. 11A is a plot of the point spread function (PSF) of the laser beam at 6 inches from the exit of the negative bi-prism employed in the laser beam optics module shown in FIGS. 5A and 5B, showing slight convergence of the spatially-distributed energy distribution of the laser at this scanning distance.
Figure 11B:
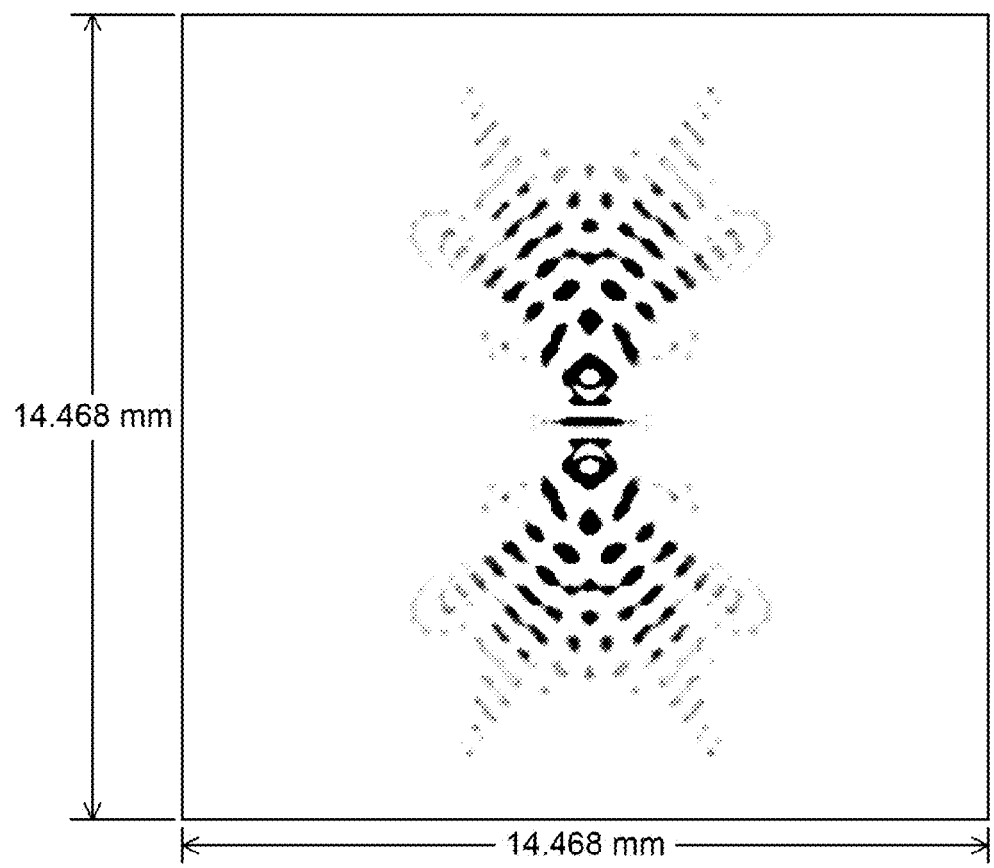
FIG. 11B is a plot of the point spread function of the laser beam at 36 inches from the exit of the negative bi-prism employed in the laser beam optics module shown in FIGS. 5A and 5B, showing significant convergence of the energy distribution of the laser beam into two closely-spaced points at this scanning distance.
Figure 11C:
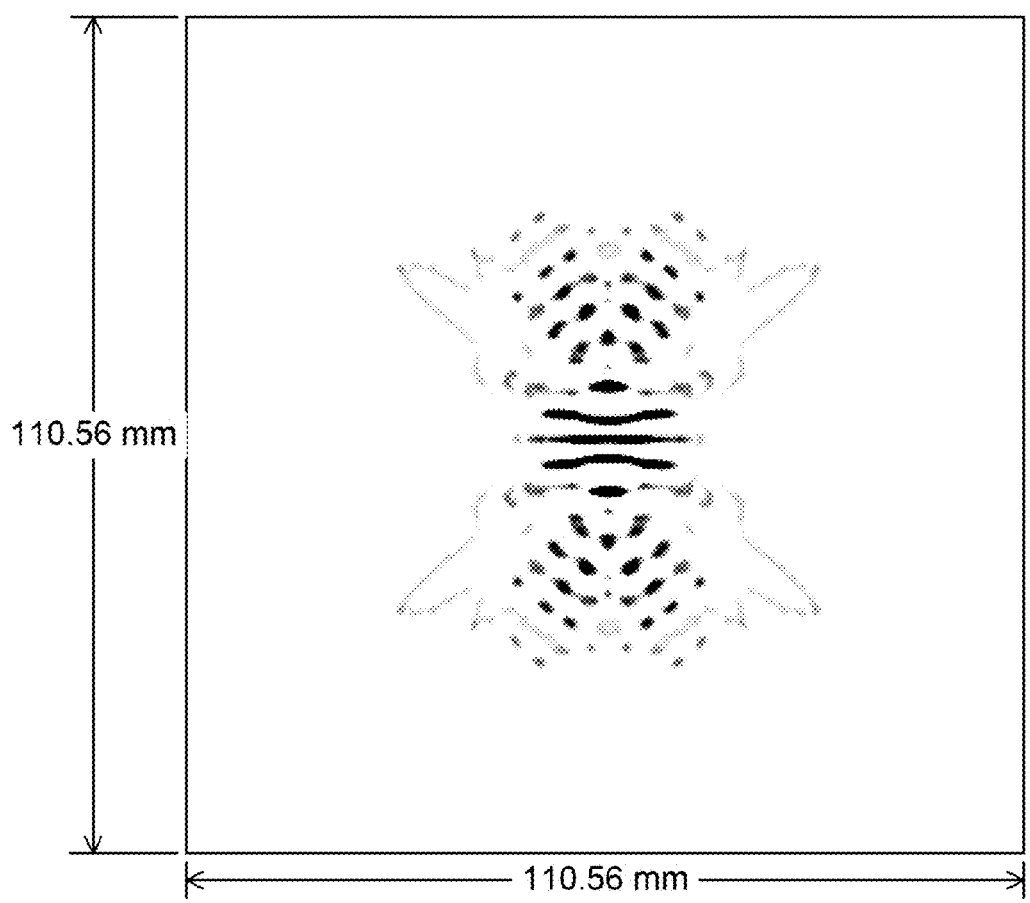
FIG. 11C is a plot of the point spread function of the laser beam at 300 inches from the exit of the negative bi-prism employed in the laser beam optics module shown in FIGS. 5A and 5B, showing the convergence of the energy distribution of the laser beam into a single point (i.e. narrow beam waist) at this scanning distance.

The primary function of the negative bi-prism element 204 is to reduce beam spot separation over the far-field ranges, as clearly shown in FIG. 11C. Spot separation tradeoff between near and far range can be adjusted by changing the bi-prism angle a between the planes of the negative bi-prism 204, shown in FIG. 8.

In the illustrative embodiment, the bi-prism angle a is selected to be about 0.5 degrees which causes the laser beam to converge into a single beam spot at the 100" range (i.e. over the far field), and the laser beam to degenerate into two beam spots separated by to ~1.5 mm at the 6" range (i.e. over the near field).

Preferably, IR-based object detection subsystem 219 is mounted in the front of its light transmission window 103 so that the IR light transmitter and IR light receiver components of subsystem 219 have an unobstructed view of an object within the laser scanning field of the system, as shown in FIG. 1. Also, the IR object presence detection module 219 can transmit into the scanning field 115, IR signals having a continuous low-intensity output level, or having a pulsed higher-intensity output level, which may be used under some conditions to increase the object detection range of the system. In alternative embodiments, the IR light transmitter and IR light receiver components can be realized as visible light (e.g. red light) transmitter and visible light (e.g. red light) receiver components, respectively, well known in the art. Typically the object detecting light beam will be modulated and synchronously detected, as taught in U.S. Pat. No. 5,340,971, incorporated herein by reference.

As shown in FIG. 4, the laser scanning module 105 comprises a number of subcomponents, namely: laser scanning assembly 110 with an electromagnetic coil 128 and rotatable scanning element (e.g. mirror) 134 supporting a lightweight reflective element (e.g. mirror) 134A; a coil drive circuit 111 for generating an electrical drive signal to drive the electromagnetic coil 128 in the laser scanning assembly 110; and near-field laser beam source 112A for producing a near-field visible laser beam 113A, and far-field laser beam source 112B and optics module 200 for producing a far-field visible laser beam 113B; and a beam deflecting mirror 114 for deflecting the laser beam 113A, or 113B (depending on which laser source is enabled at any instant in time by system controller 150) as incident beam 114A towards the mirror component of the laser scanning assembly 110, which sweeps the deflected laser beam 114B across the laser scanning field and a bar code symbol 16 that might be simultaneously present therein during system operation.

As shown in FIG. 4, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a drive circuit 111 so that it generates magnetic forces on opposite poles of the permanent magnet 135, during scanning assembly operation.

In general, system 100 supports a manually-triggered triggered mode of operation, and the bar code symbol reading method described below.

In response to a triggering event (i.e. manually pulling trigger 104), the laser scanning module 105 generates and projects a laser scanning beam through the light transmission window 103, and across the laser scanning field external to the hand-supportable housing, for scanning an object in the scanning field. The laser scanning beam is generated by either the near-field laser beam source 112A or the far-field laser beam source 112B, in response control signals generated by the system controller 150. The scanning element (i.e. mechanism) 134 repeatedly scans the selected laser beam across a code symbol residing on an object in the near portion or far portion of the laser scanning field 115. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. The programmed decode processor 108 decode processes digitized data signals, and generates symbol character data representative of each bar code symbol scanned by either a near-field or far-field laser scanning beam. Symbol character data corresponding to the bar codes read by the decoder 108, are then transmitted to the host system via the I/O communication interface 140 which may support either a wired and/or wireless communication link, well known in the art. During object detection and laser scanning operations, the system controller 150 generates the necessary control signals for controlling operations within the hand-supportable laser scanning bar code symbol reading system.

Referring to FIGS. 12A and 12B, the method of reading bar code symbols and controlling operations within the laser scanning bar code reader 100 will be described in greater detail.

As indicated in FIG. 12A, the process orchestrated by system controller 150 begins at the START Block. Then at Block A1 in FIG. 12A, the system controller determines if a trigger event has occurred (i.e. whether or not trigger 104 has been manually depressed by the operator upon seeing an object in the laser scanning field and pointing the head portion of the housing towards the object). In the event that a trigger event has been detected at Block A1, then the system is activated and the system controller determines at Block A2 whether or not the IR object presence detection subsystem 219 detects the object in the near portion of the laser scanning field 115. If IR object presence detection subsystem 219 detects an object in the near portion of the scanning field 115, then at Block B, the system controller 150 directs the laser scanning module 105 to scan the detected object with a laser beam generated by the near-field VLD 112A.

At Block C in FIG. 12A, the decode processor 108 runs a decode algorithm on the captured scan data, and if at Block D, a bar code symbol is decoded, then at Block E, the produced symbol character data is transmitted to the host system, and the system controller returns to Block A1. If, however, at Block D a bar code symbol is not decoded, then the system controller 150 determines at Block F1 whether or not the maximum scan attempt threshold has been reached, and if not, then the system controller 150 returns to Block B, and resumes the flow as indicated. However, if at Block F1, the system controller 150 determines that the maximum scan attempt threshold has been accomplished, then the system controller 150 proceeds to Block F2 and sends a Failure to Decode notification to the operator and returns to Block A1.

If at Block A2 an object is not detected in the near portion of the laser scanning field, then at Block G in FIG. 12B, the system controller directs the laser scanning module 105 to scan the detected object with a laser beam generated by the far-field VLD 112B and optical module 200. Then at Block H, one or more decode algorithms are run on the collected scan data, and at Block I, the system controller 150 determines whether or not a bar code symbol is decoded by the decode processor 108. If, at Block I, a bar code symbol is decoded, then at Block J the produced symbol character data is transmitted to the host system, and system control returns to Block A1, as shown in FIG. 3. If, however, at Block I, no bar code symbol is decoded, then the system controller 150 determines whether or not the maximum scan attempt threshold (i.e. how many attempts to decode are permitted) has been reached, and so long as the maximum number has not been reach, the system controller 150 maintains a control loop between Blocks K and G, as indicated in FIG. 12B. When the maximum number of attempts to decode has been reached at Block K, then system controller 150, optionally, sends a Failure to Decode notification to the operator, and the system returns to Block A1, as shown in FIG. 12A.

The above method of reading bar code symbols and controlling system operations is carried out in an automated manner within the laser scanning bar code symbol reader 100, wholly transparent to the operator who is holding the system in his or her hand.

By virtue of this unique method of control, the system is capable of reading both bar code symbols in near and far field portions of the laser scanning field, in a user-transparent manner using laser source switching during laser scan data capture and processing operations, without the complexities presented by prior art techniques and technologies.

The above method of reading bar code symbols and controlling system operations can also be carried out in an automated manner using an IR-based long-short range object detection and presence detection subsystem, capable of automatically determining whether or not an detected object is located within the near-field or far-field range of the system, and in response therefrom the system controller 150 automatically generating control signals to activate or drive the near-field or far-field laser beam production module, as the case may be, in wholly transparent to the operator who may be holding the system in his or her hand, or the system is supported in a stand on a countertop surface. By virtue of this alternative method of control, the system is capable of reading both bar code symbols in near and far field portions of the laser scanning field, in a user-transparent manner using laser source switching during laser scan data capture and processing operations, without the complexities presented by prior art techniques and technologies.

While the illustrative embodiments disclosed the use of a 1D laser scanning module to detect scan visible and/or invisible bar code symbols on objects, it is understood that a 2D or raster-type laser scanning module can be used as well, to scan 1D bar code symbols, 2D stacked linear bar code symbols, and 2D matrix code symbols, and generate scan data signals for decoding processing.

While hand-supportable dual laser scanning systems have been illustrated, it is understood that the laser scanning systems can be packaged in modular compact housings and mounted in fixed application environments, such as on counter-top surfaces, on wall surfaces, and on transportable machines such as forklifts, where there is a need to scan code symbols on objects (e.g. boxes) that might be located anywhere within a large scanning range (e.g. up to 20+ feet away from the scanning system). In such fixed mounted applications, the trigger signal can be generated by manual switches located a remote locations (e.g. within the forklift cab near the driver) or anywhere not located on the housing of the system.

Also, the illustrative embodiment have been described in connection with various types of code symbol reading applications involving 1-D and 2-D bar code structures (e.g. 1D bar code symbols, 2D stacked linear bar code symbols, and 2D matrix code symbols), it is understood that the present invention can be used to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

It is understood that the digital-imaging based bar code symbol reading system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the claims appended hereto.

The invention claimed is:

1. A system, comprising:
  a source;
  an optics module having an optical axis, wherein the optics module comprises:
    an aperture stop for shaping the laser beam to a predetermined diameter;
    a collimating lens for collimating the laser beam shaped by the aperture stop;
    an apodization element having a first optical surface and a second optical surface; and
    a negative bi-prism, after the apodization element along the optical axis, for transforming the energy distribution of the laser beam to substantially a single beam spot in a scanning field; and
  a scanning mechanism for scanning the laser beam across the scanning field.

2. The system of claim 1, comprising a wired communication link and/or a wireless communication link for transmitting data to an external system.

3. The system of claim 1, wherein the negative bi-prism has an angle of about 0.5 degrees.

4. The system of claim 1, wherein the source and the optics module produce a laser beam which converges to a single beam spot in the scanning field.

5. The system of claim 1, wherein the source and the optics module produce a laser beam which degenerates into two beam spots approximately 6 inches from the system.

6. A system, comprising:
a source;
an optics module having an optical axis, wherein the optics module comprises:
an aperture stop for shaping the laser beam to a predetermined diameter;
a collimating lens for collimating the laser beam shaped by the aperture stop;
an apodization element having a first optical surface and a second optical surface; and
a negative bi-prism, after the apodization element along the optical axis, for transforming the energy distribution of the laser beam to substantially a single beam spot in a scanning field;
a scanning mechanism for scanning the laser beam across the scanning field;
a photo-detector for detecting the intensity of light reflected from the scanning field and generating a signal corresponding to the detected light intensity; and
a processor for decoding the generated signal to generate data representative of a symbol in the scanning field.

7. The system of claim 6, comprising a communication interface for transmitting data to an external system.

8. The system of claim 6, wherein the negative bi-prism has an angle of about 0.5 degrees.

9. The system of claim 6, wherein the source and the optics module produce a laser beam which converges to a single beam spot approximately 100 inches from the system.

10. The system of claim 6, wherein the source and the optics module produce a laser beam which degenerates into two beam spots approximately 6 inches from the system.

11. The system of claim 6, wherein the source and the optics module produce a laser beam which degenerates into two beam spots separated by approximately 1.5 millimeters approximately 6 inches from the system.

12. An optics module having an optical axis, the optics module comprising:

an aperture stop for shaping a laser beam to a predetermined diameter, the laser beam having been produced by a source;
a collimating lens for collimating the laser beam shaped by the aperture stop;
an apodization element having a first optical surface and a second optical surface; and
a negative bi-prism, after the apodization element along the optical axis, for transforming the energy distribution of the laser beam to substantially a single beam spot in a scanning field across which a scanning mechanism scans the laser beam.

13. The optics module of claim 12, wherein the negative bi-prism has an angle of about 0.5 degrees.

14. The optics module of claim 12, wherein the source and the optics module produce a laser beam which converges to a single beam spot in the laser scanning field.

15. The optics module of claim 12, wherein the source and the optics module produce a laser beam which converges to a single beam spot approximately 100 inches from the optics module.

16. The optics module of claim 12, wherein the source and the optics module produce a laser beam which degenerates into two beam spots in a near-field portion of the laser scanning field.

17. The optics module of claim 12, wherein the source and the optics module produce a laser beam which degenerates into two beam spots approximately 6 inches from the optics module.

18. The optics module of claim 12, wherein the source and the optics module produce a laser beam which degenerates into two beam spots separated by approximately 1.5 millimeters in a near-field portion of the laser scanning field.

19. The optics module of claim 12, wherein the optics module is in the same system as a photo-detector for detecting the intensity of light reflected from the scanning field and generating a signal corresponding to the detected light intensity.

20. The optics module of claim 19, wherein the same system comprises a processor for decoding the generated signal to generate data representative of a symbol in the scanning field.

* * * * *